United States Patent [19]

Baumhauer, Jr. et al.

[11] Patent Number: 5,121,426
[45] Date of Patent: Jun. 9, 1992

[54] LOUDSPEAKING TELEPHONE STATION INCLUDING DIRECTIONAL MICROPHONE

[75] Inventors: John C. Baumhauer, Jr., Indianapolis; Jeffrey P. McAteer, Fishers; Brian A. Wittman, Indianapolis, all of Ind.

[73] Assignee: AT&T Bell Laboratories, Murray Hill, N.J.

[21] Appl. No.: 455,128

[22] Filed: Dec. 22, 1989

[51] Int. Cl.⁵ .................. H04M 1/20; H04R 1/32
[52] U.S. Cl. .................. 379/388; 379/420; 379/390; 379/432; 381/92; 381/83
[58] Field of Search ........... 379/388, 389, 390, 420, 379/410, 411, 404, 432; 381/83, 93, 111, 92

[56] References Cited

U.S. PATENT DOCUMENTS

| | | | |
|---|---|---|---|
| D. 275,096 | 8/1984 | Festa et al. | D14/12 |
| 3,573,400 | 4/1971 | Sessler et al. | 381/155 |
| 3,601,549 | 8/1971 | Mitchell | 379/420 X |
| 3,715,500 | 2/1973 | Sessler et al. | 381/191 |
| 3,755,625 | 8/1973 | Maston | 379/206 |
| 4,078,155 | 3/1978 | Botros et al. | 379/369 |
| 4,184,048 | 1/1980 | Alcaide | 379/388 |
| 4,237,339 | 12/1980 | Bunting et al. | 379/420 |
| 4,528,426 | 7/1985 | Fatovic et al. | 381/155 |
| 4,629,829 | 12/1986 | Puhl et al. | 379/58 |
| 4,658,425 | 4/1987 | Julstrom | 381/81 |
| 4,675,906 | 6/1987 | Sessler et al. | 381/92 |
| 4,712,231 | 12/1987 | Julstrom | 379/202 |
| 4,742,548 | 5/1988 | Sessler et al. | 381/92 |
| 4,747,132 | 5/1988 | Ibaraki et al. | 379/390 |
| 4,912,758 | 3/1990 | Arbel | 379/411 X |
| 4,935,919 | 6/1990 | Hiraguchi | 379/410 X |
| 4,937,877 | 6/1990 | Pocock et al. | 379/420 X |

OTHER PUBLICATIONS

Knowles Electronics, Inc.—Technical Bulletin TB-21 "EB Directional Hearing Aid Microphone Application Notes".

Primary Examiner—James L. Dwyer
Assistant Examiner—M. Shehata
Attorney, Agent, or Firm—Michael A. Morra

[57] ABSTRACT

A loudspeaking telephone station (speakerphone) includes a loudspeaker and one or more microphones within the same housing. The microphones are directional, each having a polar response characteristic that includes a major lobe, one or more side lobes, and nulls between pairs of lobes. The loudspeaker is positioned in the null of the polar response characteristic that resides between the major lobe and an adjacent side lobe. The microphone apparatus is positioned so that its major lobe is aimed in a direction that is generally perpendicular to the direction that the loudspeaker is aimed. Means are provided for increasing the distance between input sound ports of a first-order-gradient (FOG) microphone and thereby improving its sensitivity. A pair of such improved FOG microphones are used in assembling a second-order-gradient microphone. Full duplex operation is achieved when a pair of echo cancelers are added to further reduce the coupling between the transmit and receive directions of the speakerphone.

10 Claims, 7 Drawing Sheets

| CHARACTERISTIC | OMNIDIRECTIONAL | CARDIOID | SUPERCARDIOID | HYPERCARDIOID | BIDIRECTIONAL |
|---|---|---|---|---|---|
| POLAR RESPONSE PATTERN | ○ | ♡ | ♡ | ♡ | 8 |
| B | 0 | 1 | $\sqrt{3}$ | 3 | $\infty$ |
| POLAR DIRECTIVITY $D(\theta) = \frac{1 + B\cos\theta}{1 + B}$ | 1 | $\frac{1 + \cos\theta}{2}$ | $\frac{1 + \sqrt{3}\cos\theta}{1 + \sqrt{3}}$ | $\frac{1 + 3\cos\theta}{4}$ | $\cos\theta$ |
| BEAM WIDTH 3dB DOWN | 360° | 131° | 115° | 105° | 90° |
| BEAM WIDTH 6dB DOWN | 360° | 180° | 156° | 141° | 120° |
| FRONT-TO-BACK RESPONSE RATIO | 1.00 0dB | ∞ | 3.73 +11.4dB | 2.00 +6.0dB | 1.00 0dB |
| RANDOM ENERGY EFFICIENCY | 1.000 0dB | 0.333 -4.8dB | 0.268 -5.7dB | 0.250 -6.0dB | 0.333 -4.8dB |
| DISTANCE FACTOR | 1 | 1.73 | 1.93 | 2.00 | 1.73 |
| NULL | — | 180° | ±125° | ±110° | ±90° |

PRIOR ART
FIG. 5

LOUDSPEAKING TELEPHONE STATION INCLUDING DIRECTIONAL MICROPHONE

TECHNICAL FIELD

This invention relates to a loudspeaking telephone station, and more particularly to the use of one or more directional microphones therein.

BACKGROUND OF THE INVENTION

Loudspeaking telephones (also known as speakerphones or hands-free telephones) are ones that locate a microphone and a loudspeaker outside of a conventional telephone handset in somewhat close proximity to each other, thereby creating the opportunity for sustained oscillation to occur. This situation, known as singing, is often encountered in public address systems when signals from a loudspeaker are coupled to an associated microphone. Loudspeaking telephones generally include amplifiers in both the transmit and receive channels of a telephone set as well as a hybrid circuit that interconnects the transmit and receive channels to a telephone line. Although the hybrid circuit couples most of the transmitted signal energy to the telephone line, a portion, known as hybrid echo, finds its way back into the receive channel. In a similar manner a portion of the acoustic energy emanating from the loudspeaker is picked up by the transmitting microphone and is known as acoustic echo. Thus a loop is created that includes the transmit channel and the receive channel. They are coupled by hybrid echo at one end and by acoustic echo at the other. Oscillation occurs when the net gain around the loop exceeds unity (0 dB).

Perhaps the earliest technique used to circumvent the oscillation problem was the so-called "push-to-talk" system. In its normal state the transmit channel is disabled and the receive channel is enabled. When a user wants to talk he depresses a manual switch to enable the transmit channel and simultaneously disable the receive channel. Oscillation can never occur because the transmit and receive channels are never on at the same time. An improvement in the push-to-talk system came when the manual switch was replaced by circuitry that detected speech energy at the transmitter which thereafter enabled the transmit channel and disabled the receive channel—a technique known as voice switching. A refinement of the voice-switched system came with the inclusion of circuitry to compare the magnitude of the transmit and receive signals and enable the loudest talker to dominate. Apart from the dubious wisdom of rewarding such behavior, there is the problem of losing a syllable or two during the time that the direction of transmission is being reversed. Recognizing the desirability of full-duplex operation in a loudspeaking telephone (i.e., simultaneous conversation in two directions), other techniques are sought that reduce coupling between the loudspeaker and the microphone.

U.S. Pat. No. 4,658,425 discloses a microphone actuation control system such as used in the Shure ST 3000 Teleconferencing System. In this system, three first-order-gradient (FOG) microphones, each having a heart-shaped (cardioid) polar response pattern, share a common housing with a loudspeaker. Each of the microphones faces outward so that the direction of maximum sensitivity emanates radially from the center of the housing. The overall pattern provided by the three microphones allows full room (360°) coverage, although normally only one microphone is on. Unfortunately, manufacturing variations among cardioid microphones, as well as the telephone housings that hold them, lead to the creation of side lobes in the polar response pattern. (Although other lobes may be defined, for the purposes of the present invention, all lobes other than the major lobe are designated "side" lobes.) Such unintended side lobes indicate an increased responsiveness to sounds coming from the directions toward which the side lobes point. Frequently this direction is where the loudspeaker is located, and thus the likelihood of sustained oscillation is increased.

Loudspeaking telephones also suffer from reverberation (barrel effect) in which the microphone picks up non-direct speech coming from reflections of direct speech from a wall or ceiling. Sounds emanating from the receiving loudspeaker are similarly reflected and picked up by the microphone and can create a reverberant echo from the far-end talker. U.S. Pat. No. 4,629,829 discloses a full-duplex speakerphone that uses an adaptive filter (echo canceler) to reduce acoustic coupling. Echo cancelers mitigate echos by generating an estimate of the echo and then substracting the estimate from the signal corrupted by the echo. However, echo cancelers are only useful over a limited signal range and provide the greatest benefit when the acoustic coupling between microphone and loudspeaker is minimized.

It is therefore desirable to configure a loudspeaking telephone station in a manner that provides a stable polar response pattern of its associated microphone(s) with respect to manufacturing variations.

Additionally, it is desirable to provide a loudspeaking telephone station capable of full-duplex operation in locations where reverberation and room noise exist.

SUMMARY OF THE INVENTION

A loudspeaking telephone station comprises at least one directional microphone and a loudspeaker mounted in a common housing. The polar response pattern of the directional microphone includes a major lobe, one or more side lobes, and nulls between pairs of lobes; where the nulls represent substantial decreases in microphone sensitivity when compared with adjacent side lobes. Further, the loudspeaker is positioned in the null of the polar response pattern between the major lobe and an adjacent side lobe to substantially reduce acoustic coupling between the loudspeaker and the microphone.

In an illustrative embodiment of the invention, a first echo canceler is used to further reduce acoustic coupling between the loudspeaker and the microphone, and a second echo canceler used to reduce electrical coupling across the hybrid circuit. Positioning the loudspeaker and microphones in accordance with the invention yields full-duplex operation in a loudspeaking telephone station.

The features and advantages of the present invention will be more fully understood where reference is made to the detailed description and the drawing.

BRIEF DESCRIPTION OF THE DRAWING

FIG. 5 illustrates, in table form, characteristics associated with the microphone of FIG. 3 for different values of B;

DETAILED DESCRIPTION

GENERAL

Pressure Microphones

Figure 1:
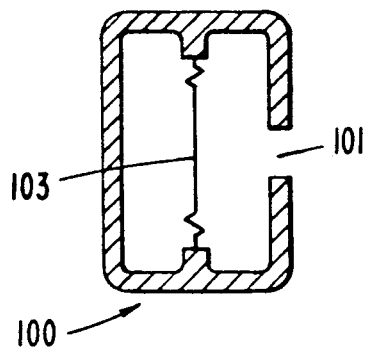
FIG. 1 discloses a pressure microphone element having an omnidirectional polar response characteristic.

Single port microphones are capable of sensing instantaneous sound pressure at their input sound port and producing an electrical output voltage signal corresponding to the magnitude of the sound pressure. Such microphones are known as "pressure microphones" and are generally constructed as shown in FIG. 1. Sound port 101 admits sound into microphone 100 which interacts with one side of diaphragm 103 to produce an electrical voltage. The other side of diaphragm 103 resides in a closed cavity whose volume affects the compliance of the diaphragm. Pressure microphones are equally responsive to sounds coming from any direction and, therefore, their response patterns are omnidirectional. FIG. 5 discloses the omnidirectional response pattern of the pressure microphone along with other selected characteristics associated with it. (The information in FIG. 5 was compiled using data in the Knowles Electronics, Inc. Technical Bulletin, TB-21; "EB Directional Hearing Aid Microphone Application Notes.")

First-Order-Gradient Microphones

Figure 2:
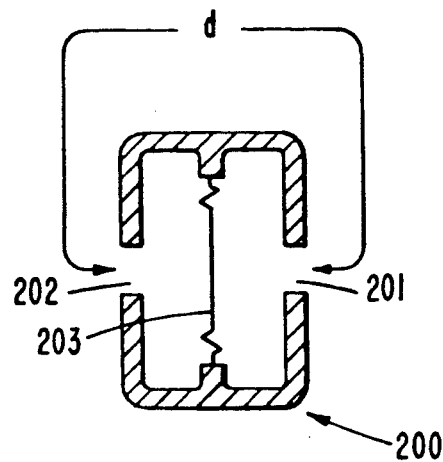
FIG. 2 discloses a first-order-gradient microphone element such as used in the present invention.

Gradient microphones are those which achieve a directional polar response characteristic by measuring the differential pressure on opposite sides of one or more diaphragms. FIG. 2 discloses a first-order-gradient (FOG) microphone 200 having input sound ports 201, 202 positioned on opposite sides of diaphragm 203. The sound ports are separated by distance "d" which represents the distance that a sound wave must travel around the FOG in going from one sound port 201 to the other 202. Movements of diaphragm 203 are converted into voltages at the output of the microphone. The magnitude of the voltage output of the FOG microphone is a function of the difference in sound pressure on the opposite sides of diaphragm 203. As distance "d" becomes smaller and smaller, so too does the output voltage from the FOG. Recall that the velocity of sound in air at 70 degrees Fahrenheit is 1128 feet per second, so that a f=2250 Hz audible signal has a wavelength of about six inches. Thus, even small separation distances provide sufficient phase difference between the sound ports 201, 202 so that the FOG microphone has a bidirectional polar response pattern such as shown in FIG. 5. Note that the polarity of the output voltage is determined by the particular side of the diaphragm that is first impinged upon by the moving wavefront. Note also that the FOG microphone is unresponsive to sounds coming from certain directions that are known as nulls. This property is of use in the present invention. A FOG microphone element, suitable for use in connection with the present invention, is the WM-55A103 manufactured by the Panasonic division of Matsushita Electric Corp.

The spatial separation "d" between the sound ports leading to opposite sides of the diaphragm 203 may be varied. The pressure gradient $\Delta p$, in the far-field, has the following relationship to "d".

$$\Delta p \alpha \sin(\tfrac{1}{2} kd \cos \theta) \tag{1}$$

where:
  $k=(2\pi f)/c$;
  $\theta$ = polar orientation of the impinging wavefront with respect to the major axis of the microphone; and
  c = wave velocity.

Equation (1) may be simplified for small values of kd to become:

$$\Delta p \alpha \tfrac{1}{2} kd \cos \theta \tag{2}$$

Figure 3:
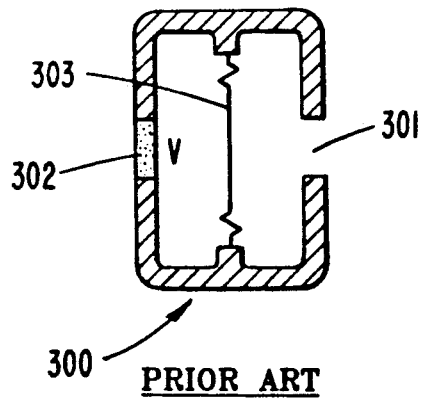
FIG. 3 discloses a first-order-gradient microphone element having a restriction in one of its sound ports.
Figure 4:
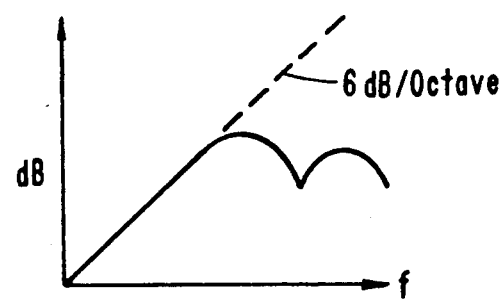
FIG. 4 illustrates the frequency response of the microphone shown in FIG. 2.

The sensitivity or frequency response of a FOG microphone [equation (1)], for the direction $\theta = 0°$, is shown in FIG. 4. It is known that the frequency response and the directivity pattern may be changed by altering the gradient microphone itself. For example, acoustic resistance $R_a$ may be introduced into one of the sound ports 302 (see FIG. 3) leading to diaphragm 303 of the FOG microphone. Such resistance alters both the directivity pattern and the frequency response.

More generally, the directivity pattern $D(\theta)$ associated with FOG microphones operating in the far field, and where kd < 1 is given by the following relationship:

$$D(\theta) = \left[ \frac{1 + B \cos \theta}{1 + B} \right] \quad (3)$$

where: $B = \dfrac{d/c}{R_a C_a}$ ; and $C_a = \dfrac{V}{\rho c^2}$

In equation (3), $\eta$ is the density of air, V is the volume of the acoustic cavity behind the diaphragm, and $C_a$ is the acoustic compliance (similar to capacitance) between diaphragm and $R_a$. From equation (3), a cardioid response is achieved when B is set equal to 1, which is to say that the time constant $R_a C_a$ is set equal to the time it takes for a sound wave to travel distance "d." FIG. 5 illustrates such a cardioid pattern as well as other characteristics of this particular FOG microphone. Another popular shape is known as a supercardioid. It is obtained when d, $R_a$ and V are adjusted such that B is set equal to the square root of 3. Further, by increasing the value of B to 3, a hypercardioid directivity pattern is created. Each of the selected microphone configurations, shown in FIG. 5, has its own set of characteristics such as: (i) the location (in degrees) of its null, (ii) distance factor-a multiplier indicating how many times more than the distance from a pressure microphone that a directional microphone has the same signal-to-random incident noise ratio, (iii) front-to-back response ratio etc.

Microphone elements having cardioid directivity patterns are sometimes used in hands-free telephony and are commercially available. One drawback to the use of cardioid microphones is their reduced signal-to-electrical noise performance at low frequencies when compared to a pressure microphone. However, the directivity of the cardioid microphone provides better signal-to-acoustic noise performance than a pressure microphone since it is less sensitive to sounds emanating from sources other than the desired direction. Indeed, FIG. 5 indicates that it is 4.8 dB less sensitive to random incident energy than the pressure (omnidirectional) microphone. Another drawback to the use of cardioid microphones is illustrated in FIG. 5. The cardioid microphone has a null located at 180° which exists only as long as B=1. Since the magnitude of B is influenced by a number of factors (see equations immediately following equation 3), and since changes in B cause a lobe to form exactly at the 180° point, reliance on this null is undesirable. Referring once again to the polar response patterns shown in FIG. 5, it can be observed that when a side lobe already exists, the direction of the null residing between the major lobe and the adjacent side lobe does not vary appreciably as the magnitude of B changes (note the variation in the position of the null from the supercardioid pattern to the bidirectional pattern). Accordingly, this particular null is most useful in reliably reducing the acoustic coupling between the loudspeaker and the microphone(s) when faced with manufacturing and other variations. It must be noted that patterns in FIG. 5 hold for far-field behavior where wave amplitudes are constant. While this isn't exactly the case for sound coming from a near-field loudspeaker, the same qualitative results are applied. As noted earlier, although various polar response patterns include a lobe which might be referred to as a "back" lobe, all lobes other than the major lobe are designated "side" lobes.

Second-Order-Gradient Microphones

Figure 6:
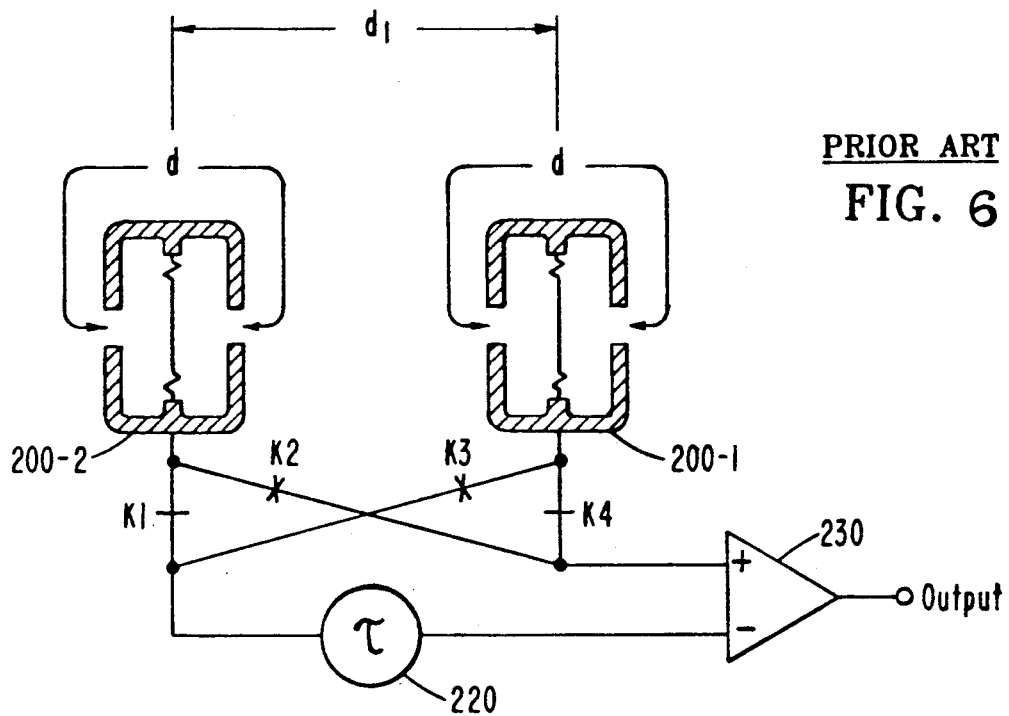
FIG. 6 discloses a second-order-gradient microphone comprising a pair of first-order-gradient microphones.
Figure 8:
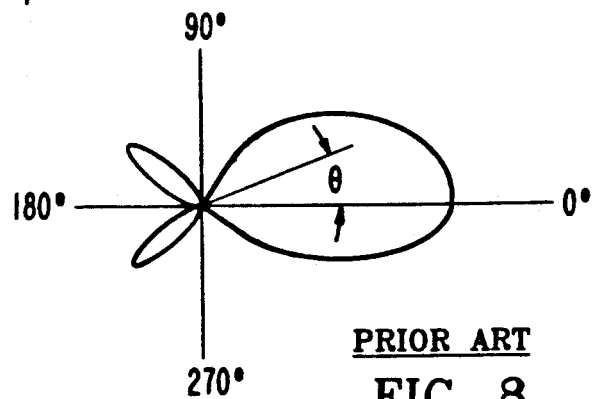
FIG. 8 illustrates the polar response characteristic of the second-order-gradient microphone shown in FIG. 6.

Second-order-gradient (SOG) microphones provide greater directivity than FOGs, and are used in applications that require substantial ambient noise rejection (i.e., noisy rooms, automobiles, etc.). SOGs, because of their gradient nature, work in the same general manner as FOGs (i.e., they achieve directivity by responding to differential sound pressure). Second-order systems are typically formed by electrically subtracting the signals from two spatially separated FOGs. The subtraction is shown more clearly in the diagram of FIG. 6 which discloses FOG microphones 200-1 and 200-2 separated by spatial distance $d_1$, each including a separation distance d between its sound ports. Time delay circuit 220 provides $\tau$ seconds of delay for electrical signals passing through it, but does not otherwise change the signals. Differential amplifier 230 subtracts the delayed electrical signal of microphone 200-2 from the electrical signal of microphone 200-1 to produce an output signal. When the time delay $\tau$ is equal to $d_1/c$, the directivity pattern shown in FIG. 8 is produced. It is noted that the direction of the FIG. 8 response pattern can be reversed by removing delay element 220 from the output of microphone 200-2 and inserting it into the output of microphone 200-1. Also, the polarities shown in differential amplifier 230 of FIG. 6 must be reversed. This is achieved by actuating contacts K1-K4, or an equivalent operation. Suitable networks for supplying time delay $\tau$ are well known; one such network is shown in FIG. 6 of U.S. Pat. No. 4,742,548 which is hereby incorporated by reference.

To better understand the relationship between sensitivity and bandwidth it is useful to introduce the mathematical definition of the far-field sensitivity of a SOG microphone, which is proportional to:

$$D(\theta) = \sin(\tfrac{1}{2}kd_2 + \tfrac{1}{2}kd_1\cos\theta)\sin(\tfrac{1}{2}kd\cos\theta) \quad (4)$$

where:
$d_2 = c\tau$.

Figure 7:
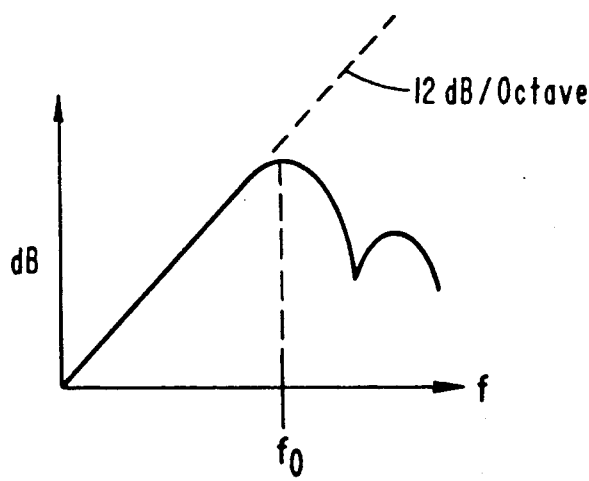
FIG. 7 illustrates the frequency response of the second-order-gradient microphone shown in FIG. 6.

The sensitivity of a SOG microphone is seen to increase with d, $d_1$ and $\tau$. Unfortunately, as d and $d_1$ are increased to allow greater sensitivity, the bandwidth of the SOG microphone is decreased. Owing to the reciprocal relationship between sensitivity and bandwidth, parameters d and $d_1$ must be carefully selected in accordance with design requirements of the SOG microphone unit. For example, referring to FIG. 7, if a bandwidth from 0.3–3.3 kHz is desired, it is advantageous to position the maximum of the unequalized frequency response at 3.3 kHz (i.e., for $\tau = d_1/c$, set $f_0 = c/4d_1 = 3.3$ kHz). The following values for d, $d_1$, and $\tau$ are employed in the preferred embodiment of the present invention: d=0.029 meter, $d_1$=0.043 meter, and $\tau = d_1/c = 0.000125$ second. With these values, the frequency response characteristic of FIG. 7 and the polar response characteristic of FIG. 8 are achieved. However, different values for d, $d_1$, and $\tau$ modify these characteristics in such a way that when sensitivity is increased, bandwidth is decreased.

Although sensitivity and bandwidth are variables in SOG microphone designs (i.e., they may be changed to meet design needs), one characteristic remains unchanged, namely the location of its nulls at ±90° from the principal axis of the microphone. This remains strictly true in the near-field over only part of the frequency band. In accordance with the invention, these are the nulls adjacent to the major lobe of its polar response characteristic, and which may be verified by setting $\theta = \pm 90°$ in equation (4). Since these nulls are perpendicular to the axis of the major lobe, it is possible to reverse the direction of the response pattern while maintaining the loudspeaker in the null between its major lobe and an adjacent side lobe. This feature is exploited in the teleconferencing system of FIG. 15 which provides 360° coverage using only three SOG microphones, each with a reversible major lobe.

Figure 9:
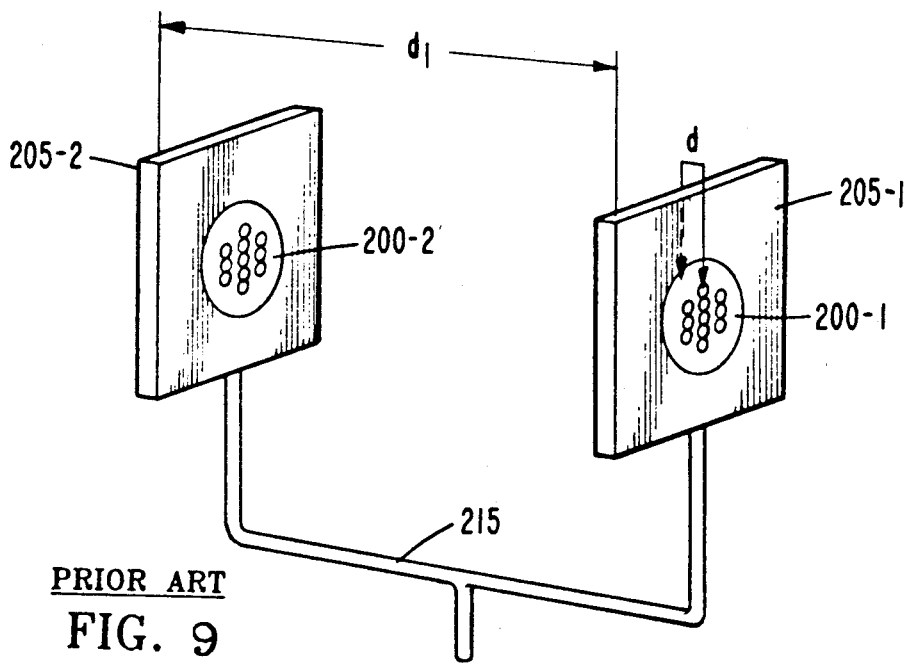
FIG. 9 discloses a second-order-gradient microphone having improved sensitivity through the use of baffles.

Referring now to FIG. 9, there is disclosed a configuration that illustrates the positioning of FOG microphones 200-1, 200-2 used in constructing a SOG microphone. Baffles 205-1, 205-5 surround the FOG microphones and provide an increase in the distance that the wavefront of an acoustic signal must travel, around the baffle, in going from one side of the FOG microphone to the other. This distance "d" (shown in FIG. 6) is a parameter that affects the sensitivity, the frequency, and the polar response characteristic of the associated microphone. FOG microphones 200-1, 200-2 are maintained in a particular orientation by support device 215. The FOG microphones are separated by spatial distance $d_1$ which is carefully selected to achieve a particular set of design requirements as discussed above. A more complete discussion of this particular unidirectional second-order-gradient microphone is presented in U.S. Pat. No. 4,742,548.

Figure 10:
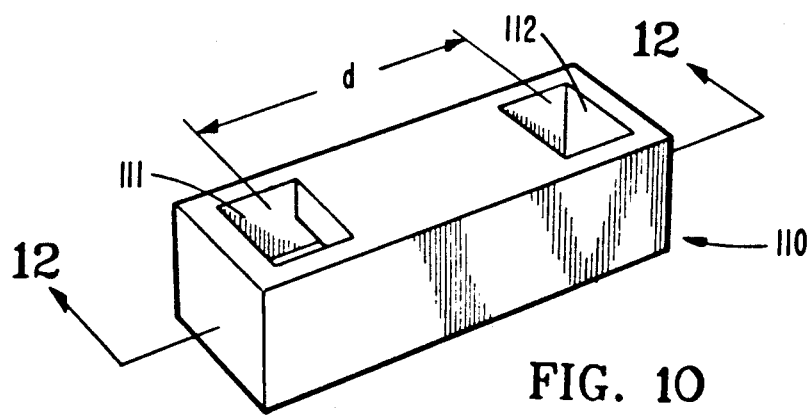
FIG. 10 discloses a perspective view of a preferred structure for housing a first-order-gradient microphone element.
Figure 11:
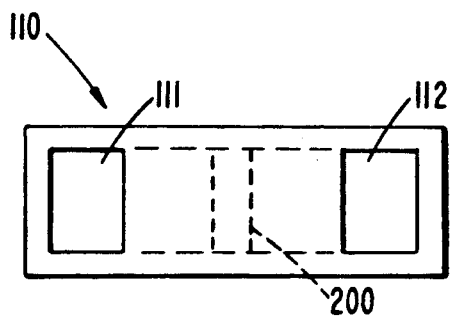
FIG. 11 shows a top view of the housing of FIG. 10.
Figure 12:
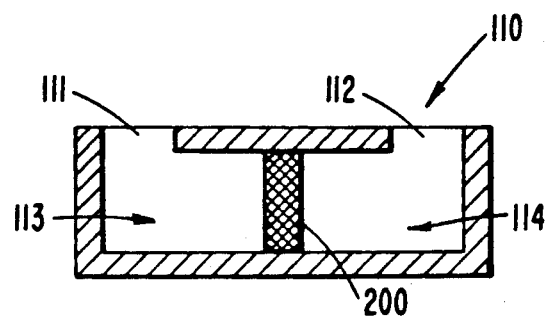
FIG. 12 shows a cross-section of the housing of FIG. 10.

FIG. 10 discloses a low profile housing 110 for a FOG microphone element that effectively extends the distance "d" between sound ports of the FOG microphone element contained therein. This rectangular block structure (housing 110) is molded from rubber or other suitable compliant material and replaces each baffle 205-1, 205-2 shown in FIG. 9. Housing 110 is a cost effective way to capture and seal the microphone unit upon insertion without adhesives. It includes openings 111, 112 at opposite ends connected by a pair of channels 113, 114 (see FIG. 12), each channel extending between one sound port of the inserted microphone and one of the openings. FIG. 11 is a top view of housing 110 that illustrates its general shape, while FIG. 12 provides a cross-section view of the microphone/housing assembly, illustrating the interrelationship of housing 110, FOG microphone 200, channels 113, 114 and openings 111, 112. In various applications, SOG microphones are constructed using a pair of collinear microphone/housing assemblies such as shown in FIG. 10.

TELECONFERENCING APPLICATION

Figure 13:
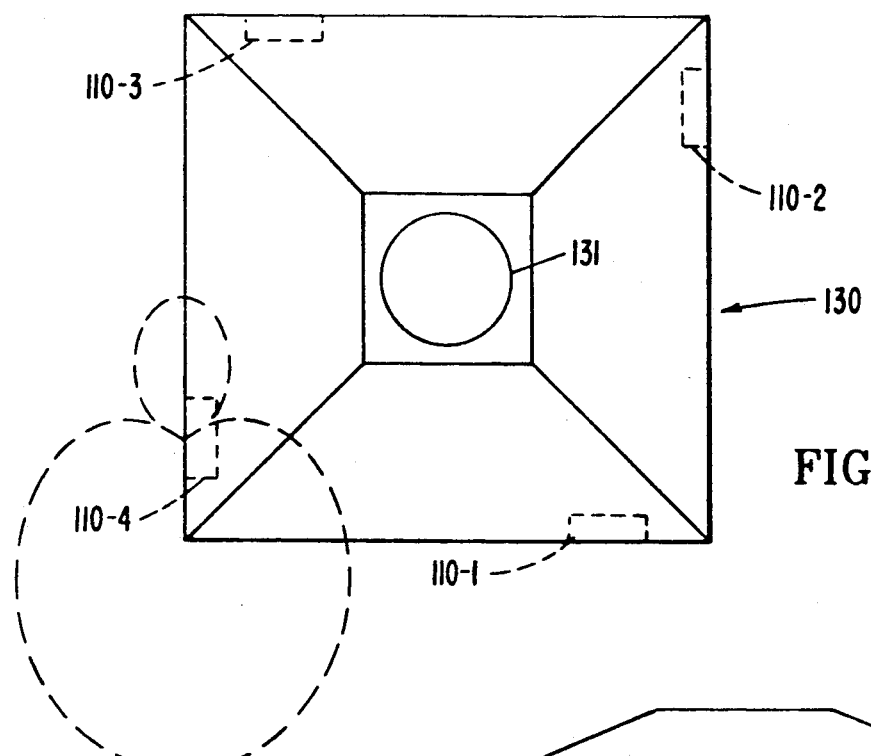
FIG. 13 discloses a top view of a teleconferencing unit using first-order-gradient microphones in accordance with the invention.
Figure 14:
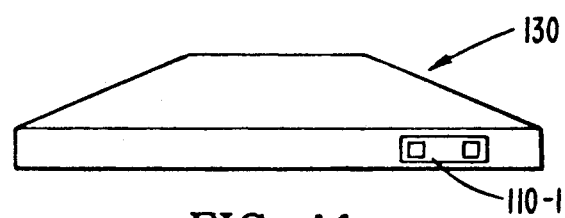
FIG. 14 discloses of front view of the teleconferencing unit shown in FIG. 13.

FIG. 13 discloses a top plan view of teleconferencing unit 130 including upwardly aimed loudspeaker 131 and four microphone housings 110-1,-2,-3,-4. The array of microphones provides full room coverage which is most useful in a conference telephone application. Since, normally, only one talker is speaking at a time, background noise and reverberation are minimized by only activating one microphone at a time. Circuits within the teleconferencing unit 130 compare the output signals from each of the microphone elements in housings 110-1,-2,-3,-4 to determine which one is the strongest. One such system is disclosed in U.S. Pat. No. 3,755,625. In response, only the signals from that microphone are transmitted to the distant end. In accordance with the invention, loudspeaker 131 is located in the null of the polar response pattern of each of the microphone/housing assemblies, and that null resides between the main lobe and an adjacent side lobe. This particular null is located at 125°-which accounts for the particular positioning of the microphones around the teleconferencing unit 130. This performance is achieved by placing a microphone element, as disclosed in FIG. 3, into the housing, thus forming a supercardioid polar response pattern (see FIG. 5). In FIG. 13, only the polar response pattern associated with a single housing 110-4 is shown, although the response patterns of each of the microphone/housing assemblies is identical. It is noted that the housing and the microphone contained therein cooperate to determine the shape of the response pattern. In this embodiment, first-order-gradient microphones are used in forming supercardioid response patterns. A front view of teleconferencing unit 130 is shown in FIG. 14 to illustrate the positioning of a representative one of the microphone housings 110-1, and to demonstrate that such units can be attractively packaged in a low-profile product.

Figure 15:
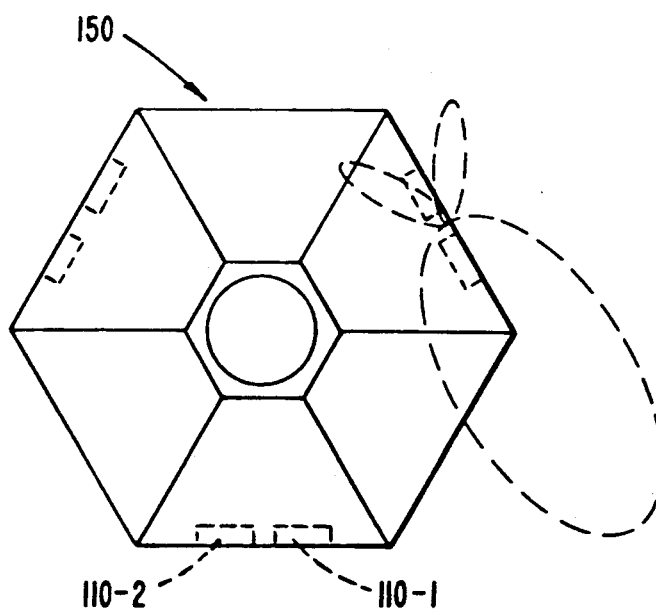
FIG. 15 discloses a top view of a teleconferencing unit using second-order-gradient microphones in accordance with the invention.
Figure 16:
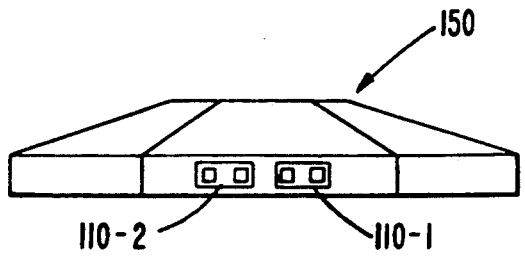
FIG. 16 discloses of front view of the teleconferencing unit shown in FIG. 15.

Similar to the above-described apparatus, FIG. 15 discloses another embodiment of a teleconferencing unit in accordance with the present invention. Teleconferencing unit 150 includes three second-order-gradient microphones positioned around the perimeter of a hexagonal, low-profile product. Each SOG microphone comprises a pair of FOG microphones and associated housings, such as 110-1 and 110-2, connected in accordance with FIG. 6. Although only one polar response pattern is shown, it is representative of the other two. Owing to the location of the nulls used in the present invention (90° and 180°), it is possible to reverse the direction of the various response patterns while still maintaining loudspeaker 151 within these nulls. Advantageously, only three SOGs are needed to provide full 360° coverage with greater directivity and less coupling between the microphone and loudspeaker. A front view of the teleconferencing unit of FIG. 15 is illustrated in FIG. 16.

SPEAKERPHONE APPLICATION

Figure 17:
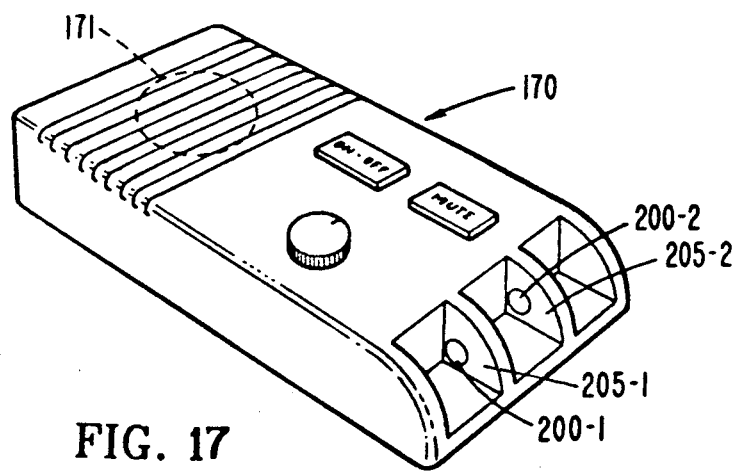
FIG. 17 discloses a perspective view of a speakerphone adjunct device using a second-order-gradient microphone in accordance with the invention.
Figure 18:
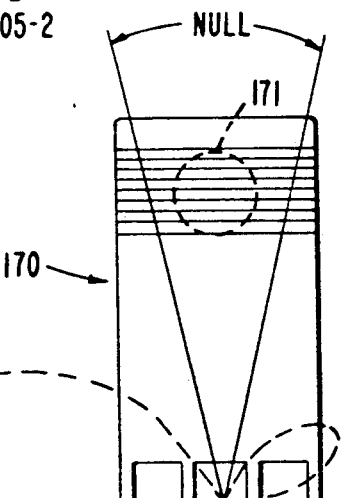
FIG. 18 is a top view of the speakerphone adjunct device of FIG. 17 illustrating its associated directivity pattern.

Shown in FIG. 17 is a speakerphone adjunct 170 that interconnects with a telephone set to provide hands-free operation. Adjuncts of this general type are well known and include a loudspeaker 171, one or more microphones 200-1, 200-2, and various other controls. Microphones 200-1 and 200-2 are of the first-order-gradient type and hence provide directionality. They are interconnected in the manner discussed in connection with FIG. 6 to form a second-order-gradient microphone having a narrower beam width than is possible with a single FOG microphone. The free field directivity pattern of such interconnections is overlaid on a top plan view of the speakerphone adjunct in FIG. 18. Baffles 205-1, 205-2 are used to improve the sensitivity of the microphone interconnection by increasing the effective distance "d" between opposite sides of microphones 200-1, 200-2 respectively. Note that in FIG. 18, the null of the polar response pattern that resides between the major lobe and the adjacent side lobe is aimed at loudspeaker 171 in accordance with the invention so that acoustic coupling between microphone and loudspeaker is minimized.

Figure 19:
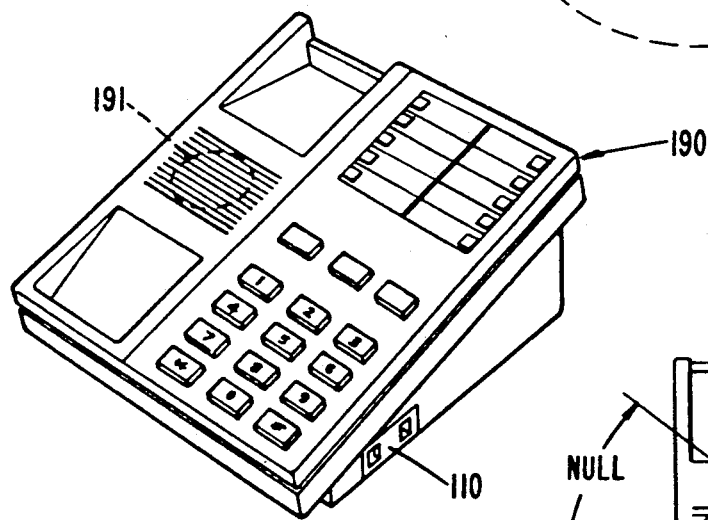
FIG. 19 discloses a perspective view of a loudspeaking telephone using a first-order-gradient microphone in accordance with the invention.

Referring now to FIG. 19, there is shown yet another embodiment of the present invention where microphone housing 110 is positioned along one side of telephone station 190. Housing 110 contains a first-order-gradient microphone elements such as shown in FIG. 3.

Figure 20:
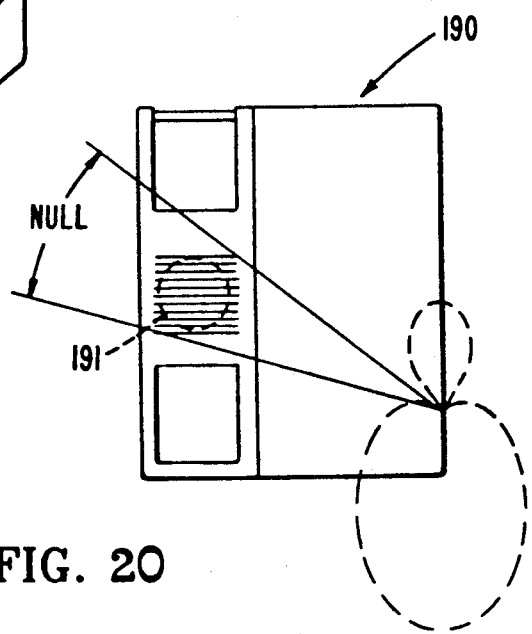
FIG. 20 is a top view of the loudspeaking telephone of FIG. 19 illustrating its associated directivity pattern.

The distance between the sound ports of housing 110 is chosen to narrow the beam width of the microphone-/housing assembly and create a supercardioid polar response pattern. A top plan view of FIG. 19 is shown in FIG. 20 which illustrates the positioning of the null. Here again, the null residing between the major lobe and its adjacent side lobe is aimed at loudspeaker 191.

FULL-DUPLEX OPERATION

Figure 21:
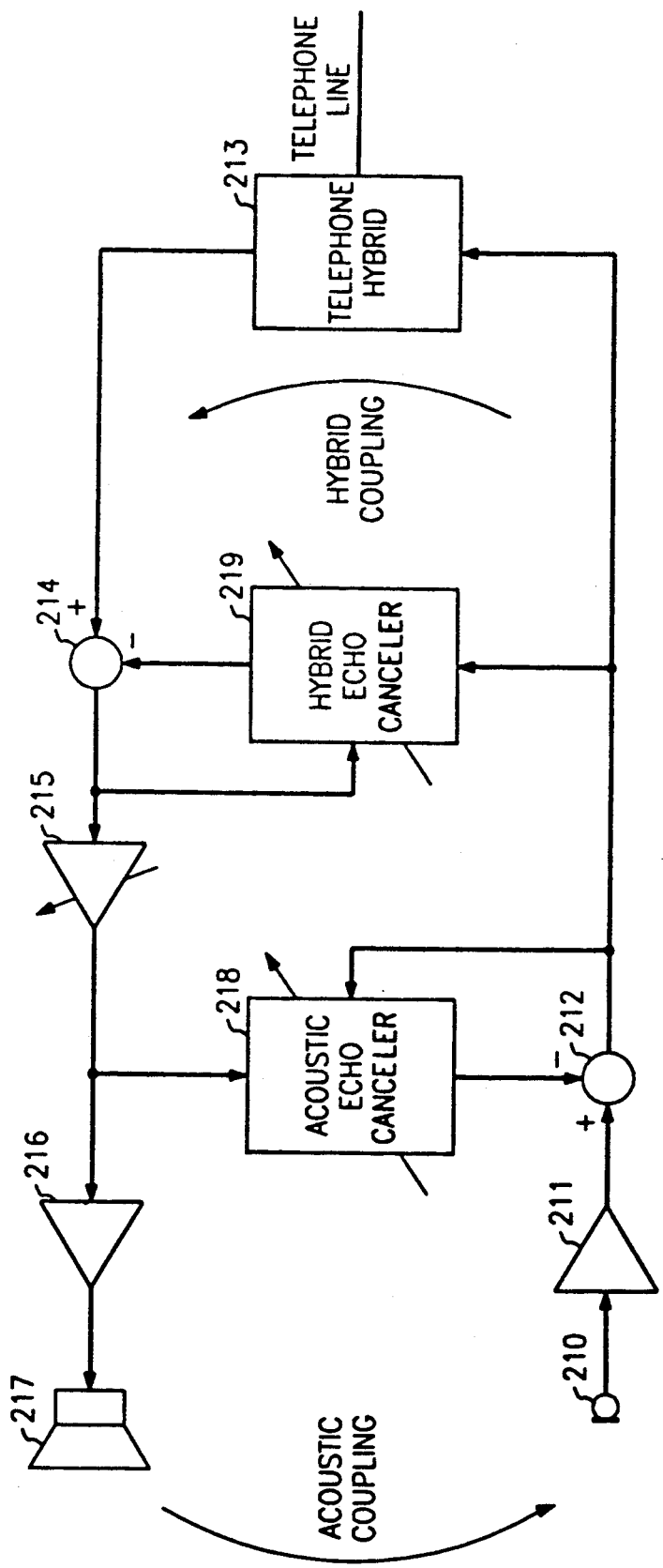
FIG. 21 discloses, in block diagram form, the significant functional components of a speech network for a loudspeaking telephone station that includes echo cancelers.

Each of the above-mentioned embodiments of FIG. 14–20 is characterized by low acoustic coupling between the loudspeaker and the microphone(s). Advantage can be taken of this condition to achieve full-duplex operation at relatively high volume levels which, heretofore, has not been achievable. Note that relatively small amounts of acoustic coupling lead to oscillation. Referring now to FIG. 21, a speech network is disclosed that eliminates enough feedback to make full-duplex transmission possible. The speech network includes a hybrid circuit 213 for connecting microphone 210 and loudspeaker 217 to a telephone line, a variable gain amplifier 215 for controlling the volume of the received signal, and echo cancelers 218, 219 for reducing acoustic and electrical feedback respectively. In accordance with the invention, loudspeaker 217 is positioned in the null of the directivity pattern of microphone 210 and its associated housing (not shown), the null residing between the major lobe and an adjacent side lobe. Component 211 provides amplification for the electrical output signal from microphone 210 which is combined in subtracting circuit 212 with the output of acoustic echo canceler 218. This subtraction operates to remove an anticipated amount of acoustic feedback generated by loudspeaker 217 and picked up by microphone 210.

Echo cancelers 218, 219 are implemented as adaptive transversal filters which automatically adapt their coefficients to the impulse response of the echo path. If the echo path is a linear system and the transversal filter contains a sufficient number of taps to cover the entire period of the echo's impulse response, the echo replica generated by the transversal filter can completely cancel out the echo signal from the received signal. Echo cancellation techniques have been widely used in baseband digital transmission systems to provide full-duplex data traffic over a twowire network, and in the telephone network to remove network echos. Echo cancelers may be constructed from general purpose Digital Signal Processors (DSP). One such DSP is the WE DSP16/DSP16A Digital Signal Processor which is commercially available from AT&T along with an Application Note that discloses program listings for single-precision and double-precision operation as an echo canceler. The single-precision echo canceler has a throughput advantage and occupies less memory space than its double-precision counterpart. However, the double precision echo canceler offers a much greater degree of cancellation and is limited only by the 16-bit quantization noise. This echo canceler is based on an adaptive transversal filter using the least mean square algorithm to update the filter coefficients. Although not shown in FIG. 21 for the sake of clarity, it is noted that the DSPs are digital and that analog-to-digital converters are required at their input to convert analog speech into digital signals for the DSP, and that digital-to-analog converters are required at their output. The aforementioned U.S. Pat. No. 4,629,829 discloses an appropriate positioning of such converters.

After an estimate of the acoustic echo is subtracted, via subtracting circuit 212, from the signal to be transmitted, the resulting signal is delivered to telephone hybrid 213 which couples most of the signal energy to the telephone line. However, a portion of the signal energy passes through the hybrid to the receive leg of the network. Hybrid echo canceler 219 subtracts an estimate of the hybrid coupling, via subtracting circuit 214, from the signal present in the receive leg. The echo cancelers function to decrease the overall magnitude of the loop gain to a level less than unity, and thereby remove the possibility of unwanted oscillation. It is now possible for the user of the loudspeaking telephone to increase the gain of the received signal, via volume control 215, to a more comfortable level without causing oscillation. Amplifier 216 provides a fixed amount of gain and loudspeaker 217 is used to convert electrical signals into audible sounds. Most of the components in the loudspeaking telephone station of FIG. 21 are well known in the art, while those having particular bearing on the present invention have been discussed in greater detail above.

Although various particular embodiments of the present invention have been shown, it is clear that modifications are possible within the spirit and scope of the invention. Such modifications include, but are not limited to, the use of multiple pressure microphones to achieve equivalent polar response characteristics, and the use of baffles where housings are shown or visa versa.

We claim:

1. A loudspeaking telephone station comprising: microphone apparatus for converting audible sounds into electrical signals, a loudspeaker for converting electrical signals into audible sounds, and a speech network that electrically connects the microphone apparatus and the loudspeaker to a telephone line, the microphone apparatus having a directional polar response characteristic such that the microphone apparatus is more sensitive to sounds emanating from one direction than from other directions, characterized in that:

the polar response characteristic of the directional microphone includes a major lobe, one or more side lobes, and nulls between pairs of lobes, said major lobe having substantially greater amplitude than any of the side lobes;

the loudspeaker is positioned in the null of said polar response characteristic that resides between the major lobe and an adjacent side lobe;

the loudspeaker is aimed in a first direction and the microphone apparatus is positioned so that its major lobe is aimed in a second direction, said first and second directions being approximately orthogonal; and the microphone apparatus comprises a first-order-gradient (FOG) microphone having sound ports on opposite sides of a common diaphragm that are separated by distance "d," the FOG microphone having a free field directivity pattern, $D(\theta)$, given by:

$$D(\theta) = \left[ \frac{1 + B \cos \theta}{1 + B} \right]$$

where: $B > 1$.

2. The loudspeaking telephone station of claim 1 wherein the speech network includes a hybrid for connecting the microphone apparatus to a telephone line via a transmit circuit and for connecting the telephone line to the loudspeaker via a receive circuit, the speech network further including a first echo canceler that responds to signals in the receive circuit and generates an estimate of an acoustic echo that couples between the loudspeaker and the microphone, the transmit circuit including subtracting means for combining the estimate of the acoustic echo with the output signals from the microphone apparatus; whereby the acoustic echo between the loudspeaker and the microphone apparatus is reduced.

3. The loudspeaking telephone station of claim 2 wherein the speech network further includes a second echo canceler that responds to signals in the transmit circuit and generates an estimate of an electrical echo that couples between the transmit and receive circuits via the hybrid, the receive circuit including subtracting means for combining the estimate of the electrical echo with signals received from the hybrid; whereby acoustic and electrical echos are reduced.

4. The loudspeaking telephone station of claim 1 wherein the FOG microphone resides within a housing that includes openings at opposite ends thereof, the structure including a pair of channels, each channel extending between one sound port of the FOG microphone and one of the openings; whereby the housing effectively increases the distance between the sound ports for improved sensitivity.

5. The loudspeaking telephone station of claim 1 wherein the FOG microphone is embedded in a baffle which is coplanar with the microphone's diaphragm and extends around its perimeter; whereby the baffle effectively increases the distance between the sound ports for improved sensitivity.

6. A loudspeaking telephone station comprising: microphone apparatus for converting audible sounds into electrical signals, a loudspeaker for converting electrical signals into audible sounds, and a speech network that electrically connects the microphone apparatus and the loudspeaker to a telephone line, the microphone apparatus having a directional polar response characteristic such that the microphone apparatus is more sensitive to sounds emanating from one direction than from other directions, characterized in that:

the polar response characteristic of the directional microphone includes a major lobe, one or more side lobes, and nulls between pairs of lobes, said major lobe having substantially greater amplitude than any of the side lobes;

the loudspeaker is located at the center of the telephone station and positioned in the null of said polar response characteristic that resides between the major lobe and an adjacent side lobe;

the loudspeaker is aimed in a first direction and the microphone apparatus is positioned so that its major lobe is aimed in a second direction, said first and second directions being approximately orthogonal;

the microphone apparatus comprises four first-order-gradient (FOG) microphones that are positioned around an outside surface of the telephone station, each FOG microphone including sound ports on opposite sides of a common diaphragm that are separated by distance "d," and each FOG microphone is characterized by a free field directivity pattern, $D(\theta)$, that is given by:

$$D(\theta) = \left[ \frac{1 + B \cos \theta}{1 + B} \right]$$

where: $B > 1$.

7. A loudspeaking telephone station comprising: microphone apparatus for converting audible sounds into electrical signals, a loudspeaker for converting electrical signals into audible sounds, and a speech network that electrically connects the microphone apparatus and the loudspeaker to a telephone line, the microphone apparatus having a directional polar response characteristic such that the microphone apparatus is more sensitive to sounds emanating from one direction than from other directions, characterized in that:

the polar response characteristic of the directional microphone includes a major lobe, one or more side lobes, and nulls between pairs of lobes, said major lobe having substantially greater amplitude than any of the side lobes;

the loudspeaker is positioned in the null of said polar response characteristic that resides between the major lobe and an adjacent side lobe;

the loudspeaker is aimed in a first direction and the microphone apparatus is positioned so that its major lobe is aimed in a second direction, said first and second directions being approximately orthogonal; and the microphone apparatus comprises three second-order-gradient (SOG) microphones that are positioned around an outside surface of the telephone station and, each SOG microphone comprising a pair of collinear first-order-gradient (FOG) microphones.

8. A loudspeaking telephone station comprising: microphone apparatus for converting audible sounds into electrical signals, a loudspeaker for converting electrical signals into audible sounds, and a speech network that electrically connects the microphone apparatus and the loudspeaker to a telephone line, the microphone apparatus having a directional polar response characteristic such that the microphone apparatus is more sensitive to sounds emanating from one direction than from other directions, characterized in that:

the polar response characteristic of the directional microphone includes a major lobe, one or more side lobes, and nulls between pairs of lobes, said major lobe having substantially greater amplitude than any of the side lobes;

the loudspeaker is positioned in the null of said polar response characteristic that resides between the major lobe and an adjacent side lobe;

the loudspeaker is aimed in a first direction and the microphone apparatus is positioned so that its major lobe is aimed in a second direction, said first and second directions being approximately orthogonal; and the microphone apparatus comprises a pair of collinear first-order-gradient (FOG) microphones separated by distance $d_1$, each FOG microphone generating an electrical signal that is connected to a different input of a subtracting circuit, one of the electrical signals being delayed by a time interval $\tau$; whereby a second-order-gradient polar response characteristic is achieved.

9. The loudspeaking telephone station of claim 8 wherein the time interval $\tau = d_1/c$, where c is the speed of sound in air.

10. The loudspeaking telephone station of claim 8 further including means for reversing the inputs to the subtracting circuit; whereby the polar response characteristic is reversible upon activation of the reversing means.

* * * * *